United States Patent [19]
Bandurco et al.

[11] 3,715,396
[45] Feb. 6, 1973

[54] N-AMINO-BENZAMIDINES
[75] Inventors: Victor Bandurco, Huntington Station; Bill Elpern, White Plains; James R. Shroff, Bronx, all of N.Y.
[73] Assignee: USV Pharmaceutical Corporation
[22] Filed: Nov. 4, 1969
[21] Appl. No.: 874,083

[52] U.S. Cl. ........260/564 R, 260/239 B, 260/245 S, 260/295.5 S, 260/293.78, 260/293.76, 260/296 R, 260/326.85, 260/343.7, 260/501.11, 260/501.14, 260/554, 260/465 E, 260/558 R, 260/561 H, 260/566 D, 260/556 AR, 260/999
[51] Int. Cl. ............................................C07c 123/00
[58] Field of Search...260/564 R, 239 R, 326.85, 293 D, 260/294.7 H, 293.78, 501.14, 295.5 S, 295 S, 343.7, 501.11

[56] References Cited

UNITED STATES PATENTS 3,458,500   7/1969   Davis..........................260/564 R X

OTHER PUBLICATIONS

R. Smith, "Open Chain Nitrogen Compound," Vol. 1, pp. 173–174 (1965)
S. Wagner and Zook, "Synthetic Organic Chemistry," pp. 647 (1965)

*Primary Examiner*—Howard T. Mars
*Assistant Examiner*—Gerald A. Schwartz
*Attorney*—Leon E. Tenebaum

[57]         ABSTRACT

Compounds of the formula

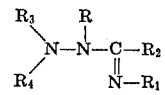

wherein R is hydrogen, alkyl, acyl, phenyl-lower alkyl, carbamoyl, benzoyl, $R_1$ is lower alkyl, pyridyl, naphthyl, or cycloalkyl, $R_2$ is phenyl or substituted phenyl, and $R_3$ and $R_4$ are hydrogen, lower alkyl, phenyl or phenyl-lower alkyl, or taken together are alkylene, possess anti-inflammatory activity.

5 Claims, No Drawings

N-AMINO-BENZAMIDINES

This invention relates to new organic compounds having valuable pharmacological activity and to processes for the preparation of said compounds. In particular, the invention relates to N-amino-benzamidines of the formula

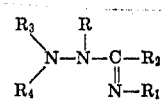

and their pharmaceutically acceptable, non-toxic acid addition salts, wherein

R is hydrogen, alkyl, alkenyl, acyl, carbamoyl phenyl-lower alkyl, substituted phenyl-lower alkyl, benzoyl, or substituted benzoyl;

$R_1$ is lower alkyl, phenyl, pyridyl, naphthyl, substituted phenyl, or cycloalkyl;

$R_2$ is phenyl or substituted phenyl, and $R_3$ and $R_4$ are hydrogen, lower alkyl, phenyl, or phenyl-lower alkyl, or $R_3$ and $R_4$ may be taken together to form an alkylene group having from four to six carbon atoms.

The R alkyl and alkenyl groups, which may be branched or straight chained, contain up to 12 carbon atoms and include such radicals as methyl, ethyl, i-propyl, amyl, allyl, octyl, 2-ethylhexyl, decyl, dodecyl and the like.

The substituted phenyl, phenyl-lower alkyl or benzoyl may carry such substituents as lower alkyl, lower alkoxy, hydroxy, halogen, trifluoromethyl, sulfonamido, or nitro.

The lower alkyl and lower alkoxy groups may be straight chained or branched and contain from one to six carbon atoms.

The cycloalkyl groups contain from five to seven carbon atoms in the ring which may be substituted with lower alkyl groups.

Preferably, R is benzyl or substituted benzyl, $R_1$ is lower alkyl, preferably isobutyl, $R_2$ is phenyl, and $R_3$ and $R_4$ are methyl.

The pharmaceutically acceptable non-toxic acid addition salts include salts of inorganic acids such as hydrochloric, hydrobromic, hydriodic, sulfuric, and phosphoric, and organic acids such as acetic, propionic, glycolic, lactic, malonic, succinic, malic, maleic, fumaric, tartaric, citric, ascorbic, benzoic, hydroxybenzoic, aminosalicylic, cinnamic, mandelic, benzenesulfonic, toluenesulfonic, nicotinic, isonicotinic and the like.

According to a process of this invention, the N-amino-benzamidines were prepared by refluxing in an inert solvent a benzimidoyl chloride of the formula

with a hydrazine of the formula

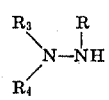

wherein R, $R_1$, $R_2$, $R_3$, and $R_4$ are the same as above. Preferably, twice the molar quantity of the hydrazine was used, and the resulting free base was then distilled. In a variation of the above process the reactants were used in a 1:1 molar ratio, and the product was obtained as the hydrochloride which could be converted to the free base by treatment with ammonia or another suitable alkaline agent. If R is hydrogen, then the resulting N-amino-benzamidine may be treated with a compound,

wherein R is the same as above except hydrogen, and the desired product can be obtained.

The hydrazines are commercially available. The benzimidoyl chlorides are readily prepared by treating an amide of the formula

with a halogenating agent such as $SOCl_2$ or $PCl_5$ in accordance with the method described in Organic Syntheses, Coll. Vol. 4, page 383.

The invention will be more fully illustrated in the examples which follow, which examples are given by way of illustration and are not to be considered as limiting.

EXAMPLE I

N'-Isobutyl-N-(3-trifluoromethylbenzyl)-N-dimethylaminobenzamidine

A mixture of 21.9 grams (0.1 mole) N'-isobutyl-N-dimethylaminobenzamidine and 19.4 grams (0.1 mole) 3-trifluoromethylbenzyl chloride in 75 ml. dry acetonitrile was refluxed for 48 hours. The solvent was removed and the residue neutralized with 10 percent sodium hydroxide to yield 25.0 grams of the free base. The free base was subjected to fractional distillation and the fraction distilling at 120°–122°C/0.05 mm. was collected. The oil solidified on standing to a yellow solid. Wt. 8 grams (22.3 percent), M.P. 38°–40°C

EXAMPLE II

N'-Isobutyl-N-dimethylamino-benzamidine

To a solution of 19.6 g. (0.1 mole) N-isobutyl-benzimidoyl chloride is 50 ml. toluene, was added dropwise, over a period of 20 min., 12.1 g. (0.2 mole) unsymmetrical dimethyl hydrazine in 120 ml. toluene. The reaction mixture was maintained at 5°–10°C during the addition. The resulting white suspension was stirred for 1 hr. at 5°–15°C and then at room temp. for approximately 16 hrs. A yellow solution with a small amount of gelatinous solid was obtained. The solid was filtered off, and the solvent removed from the filtrate. The residue, a yellow oil weighing 220 g., was distilled and the fraction distilling at 88°–91°C/0.275 mm. was collected. The free base, a yellow liquid, weighed 19.3 g., $n_D^{25}$=1.5190. The hydrochloride was prepared by dissolving 17 g. of the free base in 85 ml. ethyl acetate, cooling to 10°C and bubbling in dry hydrogen chloride (28.5 $_o$) to give 187 g. of a white product, m.p. 124°–125°C.

In accordance with the procedures described above and set forth in the examples, the additional compounds in the table below were prepared.

| R | $R_1$ | $R_2$ | $R_3$ | $R_4$ |
| --- | --- | --- | --- | --- |

| | | | | |
|---|---|---|---|---|
| H | i-But | C₆H₅ | Me | Me |
| H | i-But | 3-CF₃-C₆H₄ | Me | Me |
| H | i-But | 4-F-C₆H₄ | Me | Me |
| H | i-But | 2-Me-C₆H₄ | Me | Me |
| H | i-But | C₆H₅ | Et | Et |
| Me | i-But | C₆H₅ | Me | Me |
| Hex | i-But | C₆H₅ | Me | Me |
| Dodecyl | i-But | C₆H₅ | Me | Me |
| 1-Undecylenyl | i-But | C₆H₅ | Me | Me |
| Acetyl | i-But | C₆H₅ | Me | Me |
| Methylcarbamoyl | i-But | C₆H₅ | Me | Me |
| Benzoyl | i-But | C₆H₅ | Me | Me |
| 3-Bromobenzoyl | i-But | C₆H₅ | Me | Me |
| 4-Methoxybenzoyl | i-But | C₆H₅ | Me | Me |
| Benzyl | i-But | C₆H₅ | Me | Me |
| β-Phenethyl | i-But | C₆H₅ | Me | Me |
| Methylbenzyl | i-But | C₆H₅ | Me | Me |
| Benzyl | i-But | 4-MeO-C₆H₄ | Me | Me |
| 3-Phenoxypropyl | i-But | C₆H₅ | Me | Me |
| 2-Fluorobenzyl | i-But | C₆H₅ | Me | Me |
| 4-Fluorobenzyl | i-But | C₆H₅ | Me | Me |
| 3-Fluorobenzyl | i-But | C₆H₅ | Me | Me |
| 3-Fluorobenzyl | i-But | 4-F-C₆H₄ | Me | Me |
| 3-Fluorobenzyl | i-But | 4-Me-C₆H₄ | Me | Me |
| 4-Chlorobenzyl | i-But | C₆H₅ | Me | Me |
| 3,4-Dichlorobenzyl | i-But | C₆H₅ | Me | Me |
| 4-Cyanobenzyl | i-But | C₆H₅ | Me | Me |
| 3-Methylbenzyl | i-But | C₆H₅ | Me | Me |
| 3,4-Dimethylbenzyl | i-But | C₆H₅ | Me | Me |
| 3-Trifluoromethyl-benzyl | i-But | C₆H₅ | Me | Me |
| 3-Trifluoromethyl-benzyl | i-But | 4-F-C₆H₄ | Me | Me |
| 3-Trifluoromethyl-benzyl | i-But | 4-Me-C₆H₄ | Me | Me |
| 3-Trifluoromethyl-benzyl | i-But | 2-Me-C₆H₄ | Me | Me |
| 4-Nitrobenzyl | i-But | C₆H₅ | Me | Me |
| 3-Nitrobenzyl | i-But | C₆H₅ | Me | Me |
| 3-Nitrobenzyl | i-But | 4-Me-C₆H₄ | Me | Me |
| 3-Nitrobenzyl | i-But | 2-Me-C₆H₄ | Me | Me |
| H | Et | C₆H₅ | Me | Me |
| H | Me | C₆H₅ | Me | Me |
| H | Pr | C₆H₅ | Pr | Pr |
| H | i-Am | C₆H₅ | Me | Me |
| H | i-But | C₆H₅ | C₆H₅ | H |
| H | C₆H₅ | C₆H₅ | Me | Me |
| H | 4-Me-C₆H₄ | 4-Me-C₆H₄ | Me | Me |
| H | Hex | C₆H₅ | Me | Me |
| H | i-Pr | C₆H₅ | Me | Me |
| H | α-Naph | C₆H₅ | Me | Me |
| H | Cyclohex | C₆H₅ | Me | Me |
| H | n-But | C₆H₅ | Me | Me |
| H | Pr | C₆H₅ | Me | Me |
| Me | Pr | C₆H₅ | Me | Me |
| n-But | Pr | C₆H₅ | Me | Me |
| 3-Methylpentyl | Pr | C₆H₅ | Me | Me |
| Benzyl | Pr | C₆H₅ | Me | Me |
| α-Phenethyl | Pr | C₆H₅ | Me | Me |
| B-Phenethyl | Pr | C₆H₅ | Me | Me |
| 3-Propylphenyl | Pr | C₆H₅ | Me | Me |
| 4-Fluorobenzyl | Pr | C₆H₅ | Me | Me |
| 3,4-Dichlorobenzyl | Pr | C₆H₅ | Me | Me |
| 4-Methylbenzyl | Pr | C₆H₅ | Me | Me |
| 2-Cyclohexylethyl | Pr | C₆H₅ | Me | Me |
| H | Me | C₆H₅ | C₆H₅ | C₆H₅ |
| H | Pr | C₆H₅ | C₆H₅ | C₆H₅ |
| H | i-But | C₆H₅ | C₆H₅ | C₆H₅ |
| H | i-Am | C₆H₅ | C₆H₅ | C₆H₅ |
| H | Hex | C₆H₅ | C₆H₅ | C₆H₅ |
| H | Cyclohex | C₆H₅ | C₆H₅ | C₆H₅ |
| H | C₆H₅ | C₆H₅ | C₆H₅ | C₆H₅ |
| H | Me | C₆H₅ | Pentamethylene | |
| H | Pr | C₆H₅ | Pentamethylene | |
| H | i-But | C₆H₅ | Pentamethylene | |
| H | i-But | C₆H₅ | Pentamethylene | |
| H | i-Am | C₆H₅ | Pentamethylene | |
| H | Hex | C₆H₅ | Pentamethylene | |
| H | Cyclohex | C₆H₅ | Pentamethylene | |
| H | Me | C₆H₅ | Hexamethylene | |
| H | i-But | C₆H₅ | Hexamethylene | |
| H | Pr | C₆H₅ | Hexamethylene | |
| H | Cyclohex | C₆H₅ | Hexamethylene | |

The compounds of this invention are potent antiinflammatory agents showing a reduction in inflammation by the standard carrageenan, cotton pellet and UV erythema tests. At doses of 30 mg./kg. in the standard carrageenan test reductions up to 86 percent were obtained, while at 90 mg./kg. reductions up to 100 percent were obtained.

Certain compounds of this invention, particularly wherein R is H, $R_1$ is isobutyl, $R_3$ and $R_4$ are lower alkyl, and $R_2$ is phenyl or o-tolyl showed strong hypoglycemic activity in lowering the blood sugar levels in glucose primed rats. At 100 mg./kg. p.o. the compound where $R_2$ is o-tolyl and $R_3$ and $R_4$ are methyl gave a 44 percent reduction, while the compound where $R_2$ is phenyl and $R_3$ and $R_4$ are ethyl gave a 33 percent reduction at 50 mg./kg. p.o.

The novel compounds of this invention can be combined with solid or liquid pharmaceutical carriers and formulated into tablets, powders, or capsules or dissolved in suitable solvents for oral and parenteral administration for human or veterinary use.

We claim
1. A compound of the formula

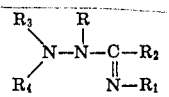

wherein

R is hydrogen, alkyl, containing up to 12 carbon atoms or alkenyl containing up to 12 carbon atoms;

$R_1$ is lower alkyl, phenyl, naphthyl, or cycloalkyl;

$R_2$ is phenyl, lower alkyl-phenyl, halophenyl, lower alkoxy-phenyl, or trifluoromethylphenyl; and $R_3$ and $R_4$ are hydrogen, lower alkyl, phenyl, phenyl-lower alkyl, and may be the same or different, or $R_3$ and $R_4$ may be joined together to form an alkylene having from 4 to 6 carbon atoms;

or salts thereof of pharmaceutically acceptable acids.

2. A compound according to claim 1 wherein $R_3$ and $R_4$ are methyl.

3. A compound according to claim 2 wherein $R_1$ is isobutyl.

4. A compound according to claim 3 wherein $R_2$ is phenyl.

5. A compound according to claim 4 wherein R is hydrogen.

* * * * *